(12) United States Patent
Kishita et al.

(10) Patent No.: US 12,539,825 B2
(45) Date of Patent: Feb. 3, 2026

(54) VEHICLE MONITORING WITH AUTHENTICATION INFORMATION

(71) Applicant: DENSO CORPORATION, Kariya (JP)

(72) Inventors: Hiroyuki Kishita, Kariya (JP); Yasuhiro Nakamura, Kariya (JP); Takashi Uefuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 314 days.

(21) Appl. No.: 18/330,395

(22) Filed: Jun. 7, 2023

(65) Prior Publication Data

US 2023/0401874 A1 Dec. 14, 2023

(30) Foreign Application Priority Data

Jun. 10, 2022 (JP) ................... 2022-094298

(51) Int. Cl.
*B60R 25/31* (2013.01)
*B60R 25/10* (2013.01)
*B60R 25/30* (2013.01)
*G06V 20/58* (2022.01)

(52) U.S. Cl.
CPC ............ *B60R 25/31* (2013.01); *B60R 25/10* (2013.01); *B60R 25/305* (2013.01); *G06V 20/58* (2022.01)

(58) Field of Classification Search
CPC ........ G06V 20/58; B60R 25/31; B60R 25/10; B60R 25/305
See application file for complete search history.

(56) References Cited

U.S. PATENT DOCUMENTS

| | | | |
|---|---|---|---|
| 2015/0161832 A1* | 6/2015 | Esselink ............ | G07C 9/00571 340/5.22 |
| 2019/0152436 A1 | 5/2019 | Uenoyama et al. | |
| 2019/0172283 A1* | 6/2019 | Endo ................... | G06Q 10/083 |
| 2020/0317159 A1 | 10/2020 | Uenoyama et al. | |
| 2021/0179117 A1* | 6/2021 | Glazman ............ | B60R 21/0136 |
| 2022/0135000 A1 | 5/2022 | Uenoyama et al. | |
| 2022/0301371 A1* | 9/2022 | Tertinek ............... | H04W 12/06 |
| 2023/0034583 A1* | 2/2023 | Roberts .................. | B60R 25/31 |

FOREIGN PATENT DOCUMENTS

| | | |
|---|---|---|
| JP | 2011-090645 A | 5/2011 |
| JP | 2017-101488 A | 6/2017 |
| JP | 2019-094639 A | 6/2019 |
| WO | WO-2019111244 A1 * | 6/2019 ........... B60R 21/015 |

\* cited by examiner

*Primary Examiner* — Casey L Kretzer
(74) *Attorney, Agent, or Firm* — Harness, Dickey & Pierce, P.L.C.

(57) ABSTRACT

A vehicle monitoring technique includes detecting a person around a vehicle based on point cloud data acquired from a sensor that emits search waves, and determining whether the detected person has authentication information valid for an action against the vehicle.

10 Claims, 3 Drawing Sheets

VEHICLE MONITORING WITH AUTHENTICATION INFORMATION

CROSS REFERENCE TO RELATED APPLICATION

This application is based on and incorporates herein by reference Japanese Patent Application No. 2022-094298 filed on Jun. 10, 2022.

TECHNICAL FIELD

The present disclosure relates to a technique for monitoring a person around a vehicle.

BACKGROUND

A technique for monitoring a person around a vehicle is known. When a person approaches a vehicle or a person wanders around the vehicle, such person is determined to be a suspicious person and a camera is turned on.

SUMMARY

According to at least one embodiment of the present disclosure, a technique for monitoring a person around a vehicle includes detecting the person around the vehicle based on point cloud data acquired from a sensor that emits search waves, and determining whether authentication information possessed by the person detected by the detection unit is valid for an action against the vehicle.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

To begin with, examples of relevant techniques will be described. In a technique according to a comparative example, when a person approaches a vehicle or a person wanders around the vehicle, such person is determined to be a suspicious person and a camera is turned on. In this case, according to the comparative example, the camera is turned on, but the camera is set to be in a standby state in which photographing and recording are not performed.

When detecting an abnormality such as an impact applied to the vehicle or an opening of a door, photographing and recording by the camera start.

However, as a result of detailed studies by the inventor, a person approaching a vehicle or wandering around the vehicle may not be a suspicious person. For example, an owner of a vehicle may drive the vehicle, or a person requested to perform a service against the vehicle may approach the vehicle or perform an authorized action such as moving around the vehicle.

Even a person who performs an authorized action against a vehicle may be determined to be a suspicious person when approaching the vehicle or wandering around the vehicle.

In contrast, the present disclosure can provide a technique for monitoring a person around a vehicle on the basis of whether a behavior to the vehicle is authorized.

A vehicle monitoring device according to one aspect of the present disclosure includes a detection unit and an authentication unit. The detection unit detects a person around a vehicle based on point cloud data acquired from a sensor that emits search waves. The authentication unit determines whether authentication information possessed by the person detected by the detection unit is valid for an action against the vehicle.

According to this configuration, a person around the vehicle can be monitored appropriately on the basis of whether the person has valid authentication information.

Hereinbelow, embodiments of the present disclosure will be described with reference to the drawings.

1. Configuration

Figure 1:
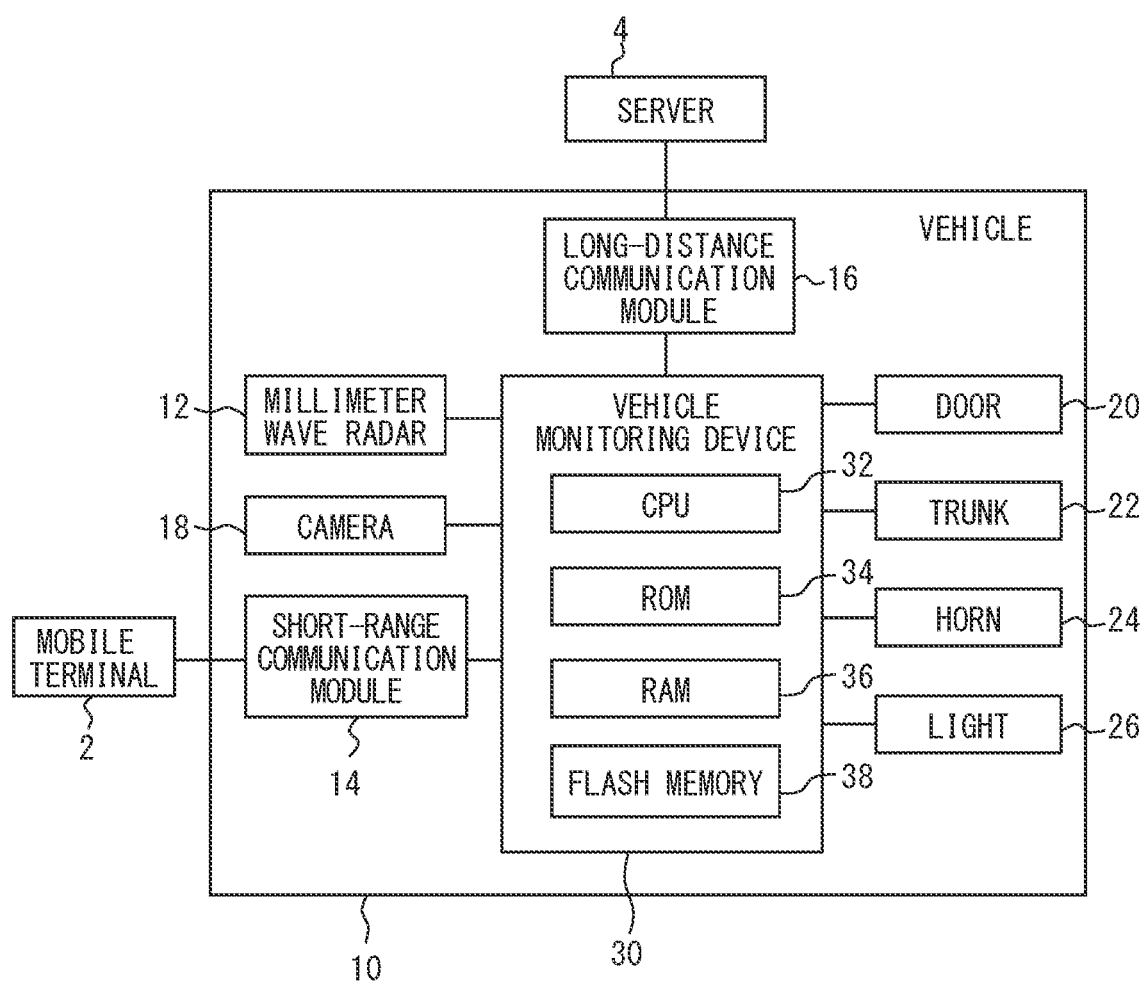
FIG. 1 is a block diagram illustrating a configuration of a vehicle.

A vehicle monitoring device 30 illustrated in FIG. 1 is mounted on a vehicle 10 and monitors a person around the vehicle 10. The vehicle monitoring device 30 is a well-known microcontroller including a CPU 32, a ROM 34, a RAM 36, and a flash memory 38. The vehicle monitoring device 30 is activated when the vehicle 10 is stopped and its engine is stopped. The vehicle monitoring device 30 executes a vehicle monitoring process described later based on a program stored in the ROM 34 or the flash memory 38.

When the vehicle monitoring device 30 is activated, a monitoring mode of the vehicle monitoring device 30 is first set to be a normal mode in which a person around the vehicle 10 is detected based on point cloud data acquired from a millimeter wave radar 12.

Figure 2:
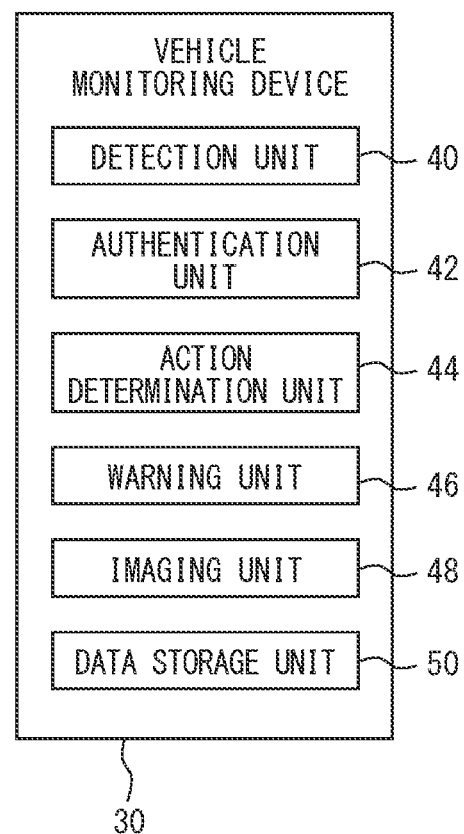
FIG. 2 is a block diagram illustrating a vehicle monitoring device.

As illustrated in FIG. 2, the vehicle monitoring device 30 functions as a detection unit 40, an authentication unit 42, an action determination unit 44, a warning unit 46, an imaging unit 48, and a data storage unit 50.

The millimeter wave radar 12 emits a millimeter wave as a search wave, and the detection unit 40 acquires a measurement result from the millimeter wave radar 12. The measurement result includes a distance to an object and a direction toward the object corresponding to an emission direction of the millimeter wave. The millimeter wave radar 12 emits the millimeter wave at predetermined time intervals in a predetermined angle range in each of a horizontal direction and a vertical direction. Therefore, the detection unit 40 acquires the measurement result as point cloud data.

The detection unit 40 detects a person around the vehicle 10 from a shape of the point cloud data acquired from the millimeter wave radar 12.

The authentication unit 42 acquires, for example, an authentication code as a part of authentication information from a mobile terminal 2 carried by a person around the vehicle 10 via a short-range communication module 14. A validity period is set in the authentication code. The mobile terminal 2 may be a dedicated terminal or a general-purpose terminal such as a smartphone.

The authentication unit 42 determines whether the authentication information acquired from the mobile terminal 2 is valid for an action against the vehicle 10. When the authentication code is acquired as a part of the authentication information as described above, the authentication information being valid indicates that the authentication code is valid and the authentication code is within the validity period.

The validity period of the authentication information is set to be an indefinite period for the owner of the vehicle 10, for example. In addition, the validity period of the authentication information may be set to be a contract period in which a service is valid, for example, in a case of a user who has made a contract for car rental or car sharing or a case of a service provider who has been requested to provide a service via an action against the vehicle 10 within a predetermined period.

In addition, the authentication unit 42 acquires an authorized action from a table or the like associated with the authentication information. The authorized action is an action that the detected person is authorized to take against the vehicle 10. The authentication unit 42 may inquire a server 4 about the authorized action for the vehicle 10 via a long-distance communication module 16.

The action determination unit 44 acquires a number of persons and distances between the persons and the vehicle 10 from the point cloud data of the detected person. The action determination unit 44 determines the action of the person based on a position and trajectory of the point cloud data of the detected person. For example, the action determination unit 44 determines whether the detected person approaches, leaves or enters the vehicle 10 or stop moving.

In addition to the point cloud data, the action determination unit 44 determines what action the person is performing, such as whether the detected person has opened a door 20 or a trunk 22 or has started the engine of the vehicle 10, based on various signals of the vehicle 10.

When the authentication unit 42 determines that the authentication information is valid within the validity period but is not authentication information in which driving of the vehicle 10 is authorized, the action determination unit 44 determines whether a person having the authentication information is performing an authorized action corresponding to the authentication information against the vehicle 10 other than driving of the vehicle 10.

The action corresponding to the valid authentication information other than driving of the vehicle 10 is, for example, an action shown in (1) or (2) below.

(1) A deliverer opens the trunk 22 of the vehicle 10 and puts a delivery into the trunk 22.

(2) A cleaner opens the door 20 and trunk 22 of the vehicle 10 and cleans the interior and exterior of the vehicle 10.

An action that does not correspond to the valid authentication information other than driving of the vehicle 10 is, for example, an action shown in (3) or (4) below.

(3) The deliverer opens the door 20 of the vehicle 10 to enter the vehicle.

(4) The cleaner starts the engine.

In the case of the following (5) or (6), the warning unit 46 gives a warning to a target person by sounding the horn 24 or blinking a light 26, for example.

(5) Persons who do not have valid authentication information are at positions close to the vehicle 10, or one person who does not have valid authentication information is at a position close to the vehicle 10 and does not leave the vehicle 10 within a predetermined time.

(6) As in (3) and (4) described above, the detected person does not take the action corresponding to the authentication information against the vehicle 10 other than driving of the vehicle 10.

In the case of (5) or (6) described above, the imaging unit 48 activates a camera 18 to capture an image of the target person. The camera 18 captures an image of at least the outside of the vehicle 10 among the inside and outside of the vehicle.

The data storage unit 50 stores the point cloud data of the detected person and the image data captured by the imaging unit 48 with the camera 18 in a storage device such as the RAM 36 or the flash memory 38.

Further, the data storage unit 50 transmits the point cloud data and the image data stored in the storage device to the server 4 via the long-distance communication module 16.

2. Process

Figure 3:
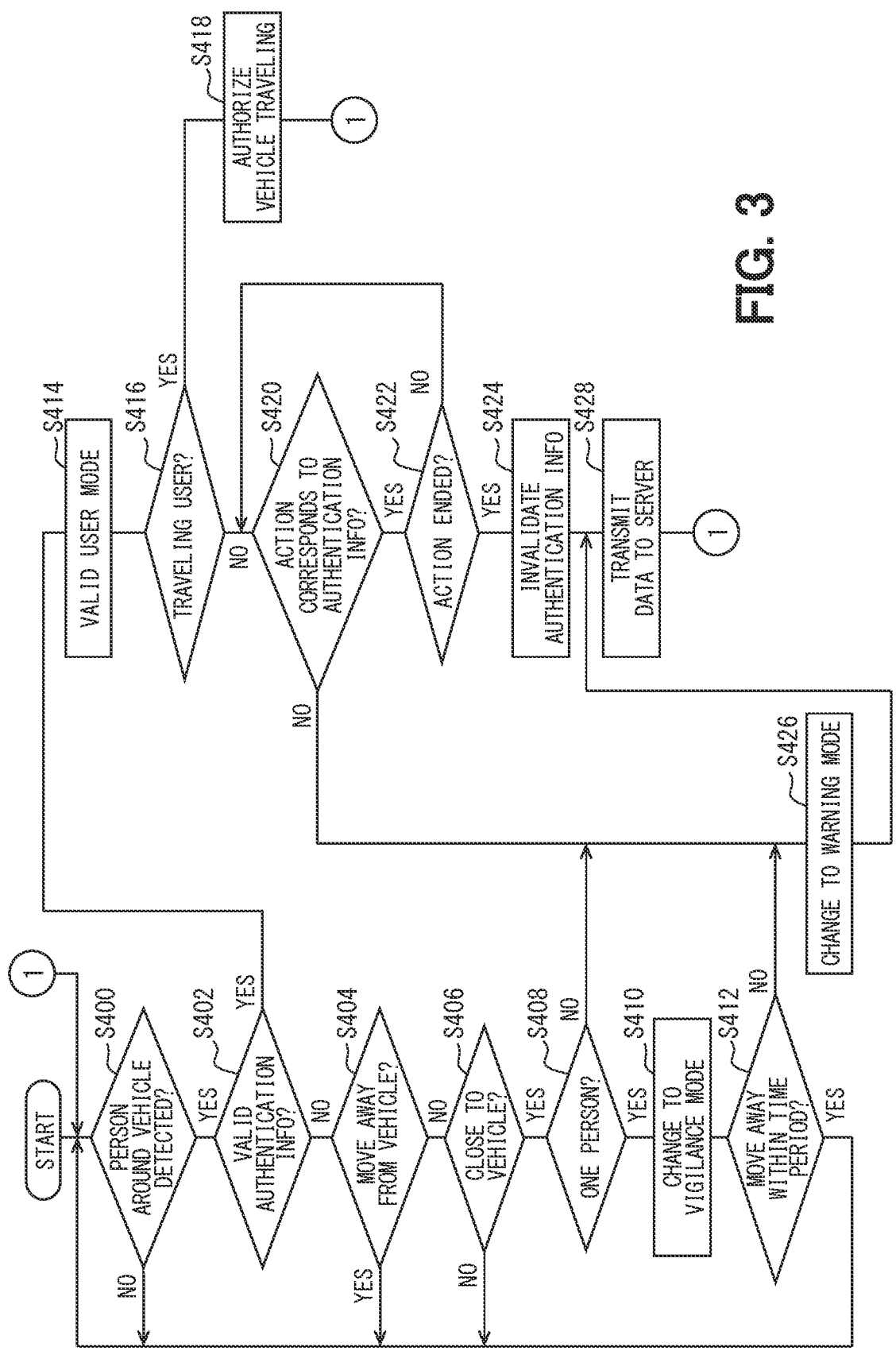
FIG. 3 is a flowchart illustrating a vehicle monitoring process.

Next, a vehicle monitoring process executed by the vehicle monitoring device 30 will be described with reference to the flowchart of FIG. 3. The flowchart of FIG. 3 is executed when the vehicle 10 is stopped and the engine is stopped.

In step S400, the detection unit 40 determines whether a person around the vehicle 10 is detected based on the point cloud data acquired from the millimeter wave radar 12.

When the determination in step S400 is YES, that is, when the detection unit 40 detects a person around the vehicle 10, the authentication unit 42 determines in step S402 whether valid authentication information has been acquired from the mobile terminal 2 of the detected person. As described above, when the authentication code is acquired as a part of the authentication information, the authentication information being valid indicates that the authentication code is valid and the authentication code is within the validity period.

When the determination in step S402 is YES, that is, when valid authentication information is acquired from the mobile terminal 2 of the detected person, the authentication unit 42 proceeds to step S414.

When the determination in step S402 is NO, that is, when the authentication information is not acquired from the mobile terminal 2 of the detected person or when the acquired authentication information is not valid, there is a possibility that the detected person is a suspicious person who performs a malicious action against the vehicle 10. Therefore, in step S404, the action determination unit 44 determines whether the detected person moves away from the vehicle 10 based on a trajectory of the point cloud data acquired from the millimeter wave radar 12.

When the determination in step S404 is YES, that is, when the detected person moves away from the vehicle 10, the action determination unit 44 determines that the detected person is not a suspicious person who performs a malicious action against the vehicle 10, and the process returns to step S400.

When the determination in step S404 is NO, that is, when the detected person does not move away the vehicle 10, the action determination unit 44 determines whether the detected person is close to the vehicle 10 based on the distance between the person indicated by the point cloud data and the vehicle 10 in step S406. For example, when there is a person detected within 1 meter around the vehicle 10, the action determination unit 44 determines that the detected person is a suspicious person unnecessarily close to the vehicle 10.

When the determination in step S406 is NO, that is, when the detected person does not move away from the vehicle 10 but is not close to the vehicle 10, the action determination unit 44 determines that the detected person is not a suspicious person who performs a malicious action against the vehicle 10, and returns to step S400.

When the determination in step S406 is YES, that is, when the detected person is close to the vehicle 10, the action determination unit 44 determines whether the number of the detected person is one in step S408. When the determination in step S408 is NO, that is, when multiple persons are detected, the action determination unit 44 determines that a situation in which there are multiple persons who do not have valid authentication information near the vehicle 10 is abnormal and the multiple persons are suspicious persons, and the process proceeds to step S426.

When the determination in step S408 is YES, that is, when the number of the detected persons is one, the warning unit 46 changes the monitoring mode to a vigilance mode in step S410.

In the vigilance mode, the data storage unit 50 stores the point group data of the person acquired from the millimeter wave radar 12 in time order in the storage device such as the RAM 36 or the flash memory 38. Further, in step S410, the imaging unit 48 turns on the camera 18 and captures an image of an action of the detected person. The data storage unit 50 stores the captured image data of the person in the storage device.

In step S412, the action determination unit 44 determines whether the detected person moves away from the vehicle 10 within a predetermined time period. When the determination in step S412 is YES, that is, when the detected person moves away from the vehicle 10 within the predetermined time period, the action determination unit 44 determines that the detected person is not a suspicious person, and the process proceeds to step S400.

When the determination in step S412 is NO, that is, when the detected person does not move away from the vehicle 10 within the predetermined time period, the action determination unit 44 determines that the detected person is a suspicious person, and proceeds to step S426.

In step 414, the warning unit 46 changes the monitoring mode to a valid user mode. In the valid user mode, the data storage unit 50 stores the point cloud data acquired from the millimeter wave radar 12 in the storage device.

In step S416, the authentication unit 42 determines whether the detected person is a traveling user who is authorized to drive and travel the vehicle 10 based on the acquired valid authentication information. The traveling user may be an owner of the vehicle 10 or a user who has made a contract with a car rental provider or car sharing system.

When the determination in step S416 is YES, that is, when the detected person is the traveling user, the authentication unit 42 authorizes the detected person to drive the vehicle 10 in step S418, and the process proceeds to step S400. The traveling user is also authorized to open the door 20 and the trunk 22 of the vehicle 10.

When the determination in step S416 is NO, that is, when the detected person has the valid authentication information but is not the traveling user, the action determination unit 44 determines in step S420 whether the detected person is performing an action corresponding to the valid authentication information other than driving.

When the determination in step S420 is NO, that is, when the detected person does not perform the action corresponding to the valid authentication information, the action determination unit 44 causes the process to proceed to step S426.

When the determination in step S420 is YES, that is, when the detected person performs the action corresponding to the valid authentication information, the action determination unit 44 determines whether the action of the detected person has ended in step S422. Whether the action of the detected person has ended is determined by whether the door 20 and the trunk 22 of the vehicle 10 are closed and locked and the detected person has left the vehicle 10.

When the determination in step S422 is NO, that is, when the action of the detected person has not ended, the action determination unit 44 returns the process to step S420. When the determination in step S422 is YES, that is, when the action of the detected person has ended, the authentication unit 42 invalidates the authentication information in step S424 by invalidating the authentication code of the person who has ended the action or by ending the validity period, and the process proceeds to step S428.

In step S426, the warning unit 46 changes the monitoring mode to a warning mode, and gives a warning to the detected person by sounding the horn 24 or blinking the light 26. In the warning mode, the data storage unit 50 stores the point cloud data in the storage device in time order when the point cloud data is not stored.

In addition, in step S426, when the power of the camera 18 is not turned on, the imaging unit 48 turns on the power of the camera 18 and captures an image of an action of the detected person. The data storage unit 50 stores the captured image data in the storage device. After the end of step S426, the warning unit 46 causes the process to proceeds to step S428.

In step S428, the data storage unit 50 transmits the point cloud data stored in the valid user mode or the point cloud data and the image data stored in the vigilance mode and the warning mode from the storage device to the server 4. Then the transmitted data is stored in the server 4, and the process proceeds to step S400.

In the embodiment described above, the millimeter wave radar 12 corresponds to a sensor.

Further, step S400 corresponds to the detection unit 40, steps S402, S416, and S424 correspond to the authentication unit 42, steps S404 to S408, S412, S420, and S422 correspond to the action determination unit 44, step S426 corresponds to the warning unit 46, steps S410 and S426 correspond to the imaging unit 48, and steps S410, S414, S426 and S428 correspond to the data storage unit 50.

3. Effects

The embodiment described above produces the following effects.

(3a) An authorized action of a detected person with respect to the vehicle 10 can be determined based on not only the point cloud data of the person acquired from the millimeter wave radar 12 but also the authentication information of the detected person. Accordingly, a person around the vehicle 10 can be appropriately monitored.

(3b) Since the power of the camera 18 is not turned on and capturing of an image is not started until the monitoring mode is changed to the vigilance mode or the warning mode, power consumption can be reduced when the vehicle 10 is not driven but parked.

(3c) When the detected person is a suspicious person who does not have valid authentication information, at least the point cloud data among the point cloud data and the image data is stored in the storage device of the vehicle 10, and is transmitted to and stored in the server 4. Thus, the action of the suspicious person can be verified based on the point cloud data and the image data stored in the storage device of the vehicle 10 or transmitted to the server 4.

(3d) When the detected person is not the traveling user even though the detected person has the valid authentication information, at least the point cloud data among the point cloud data and the image data is stored in the storage device of the vehicle 10, and is transmitted to and stored in the server 4. Thus, the action of the person can be verified based on the point cloud data and the image data stored in the storage device of the vehicle 10 or transmitted to the server 4.

(3e) Even when the detected person is the traveling user who is authorized to drive the vehicle 10, the point cloud data is stored in the storage device of the vehicle 10. Thus, the action of the person can be verified based on the point cloud data stored in the storage device of the vehicle 10.

(3f) Since it is determined whether the authentication information is valid in consideration of the validity period of the authentication information, the validity of the authentication information can be accurately determined.

4. Other Embodiments

Although the embodiment of the present disclosure has been described above, the present disclosure is not limited to the embodiment described above, and various modifications can be made to implement the present disclosure.

(4a) In the above embodiment, in the determination of the validity of the authentication information acquired from the mobile terminal 2 of the detected person uses the validity of the authentication code, but the present invention is not limited thereto. For example, instead of the authentication code, the validity of the authentication information may be determined whether the face of the person photographed by the camera 18 matches a face of a registered authorized person. A validity period is set for the registered face.

In this case, when a person is detected in step S400, the camera 18 is activated and shooting is started in order to authenticate the face of the person in step S402, but image data is not stored until the monitoring mode is changed to the vigilance mode or the warning mode.

(4b) In the above-described embodiment, the data storage unit 50 transmits the point cloud data and the image data stored in the RAM 36 or the flash memory 38 to the server 4. However, the point cloud data and the image data may be stored in the storage device of the vehicle 10 without being transmitted to the server 4. Even in this case, if the vehicle 10 remains at the parking position without being stolen, the action of the detected person can be verified based on the data stored in the storage device of the vehicle 10.

(4c) Instead of the millimeter wave radar 12 used in the above-described embodiment, for example, a Lidar may be used as a sensor that measures an object around the vehicle 10 by emitting a search wave. The Lidar is an abbreviation for light detection and ranging.

(4d) The vehicle monitoring device 30 and a method thereof described in the present disclosure may be realized by a dedicated computer provided by configuring a processor and a memory programmed to execute one or multiple functions embodied by a computer program. Alternatively, the vehicle monitoring device 30 and the technique thereof according to the present disclosure may be achieved by a dedicated computer provided by constituting a processor with one or more dedicated hardware logic circuits. Alternatively, the vehicle monitoring device 30 and the method thereof described in the present disclosure may be realized by one or more dedicated computer, which is configured as a combination of a processor and a memory, which are programmed to perform one or more functions, and a processor which is configured with one or more hardware logic circuits. The computer program may store a computer-readable non-transitional tangible storage medium as an instruction to be executed by the computer. The technique for realizing the functions of the respective units included in the vehicle monitoring device 30 does not necessarily need to include software, and all of the functions may be realized with the use of one or multiple hardware.

(4e) Multiple functions of one element in the above embodiment may be implemented by multiple elements, or one function of one element may be implemented by multiple elements. Further, multiple functions of multiple elements may be implemented by one element, or one function implemented by multiple elements may be implemented by one element. Moreover, a part of the configuration of the above-described embodiment may be omitted. At least a part of the configuration of the above embodiment may be added to or replaced with a configuration of another embodiment.

(4f) The present disclosure can be realized in various forms, in addition to the vehicle monitoring device 30 described above, such as a system including the vehicle monitoring device 30 as a component, a program for causing a computer to function as the vehicle monitoring device 30, a non-transitory tangible storage medium such as a semiconductor memory storing the program, or a vehicle monitoring method.

What is claimed is:

1. A vehicle monitoring device comprising:
a processor with a memory storing computer program code executable by the processor, the processor is configured to cause the vehicle monitoring device to:
detect a person around a vehicle based on point cloud data acquired from a sensor that emits search waves;
determine whether the detected person has authentication information valid for an action against the vehicle;
determine what action the person is preforming based on at least the point cloud data;
determine an action allowed to be performed by the person against the vehicle based on the authentication information when the authentication information is determined to be valid; and
determine whether the action performed by the person corresponds to the action allowed to be performed by the person when the authentication information is determined to be valid.

2. The vehicle monitoring device according to claim 1, wherein
the processor is configured to acquire the authentication information from a mobile terminal possessed by the person and determine whether the authentication information is valid.

3. The vehicle monitoring device according to claim 1, wherein
the processor is configured to determine that the authentication information is not valid when a validity period of the authentication information of the person has expired.

4. The vehicle monitoring device according to claim 1, wherein
the processor is configured to determine whether the person is performing the action corresponding to the authentication information against the vehicle other than driving of the vehicle when the processor determines that the person has the valid authentication information but the valid authentication information does not correspond to driving of the vehicle.

5. The vehicle monitoring device according to claim 4, wherein
the processor is configured to give a warning to the person
when the processor determines that the person does not have the valid authentication information, or
when the processor determines that the person has the valid authentication information but the valid authentication information does not correspond to driving of the vehicle, and the processor determines that the person does not perform the action corresponding to the authentication information against the vehicle other than driving of the vehicle.

6. The vehicle monitoring device according to claim 1, wherein
the processor is configured to activate a camera and capture an image of the person by the camera
when the processor determines that the person does not have the valid authentication information, or
when the processor determines that the person has the valid authentication information but the valid authentication information does not correspond to driving of the vehicle, and the processor determines that the person does not perform the action corresponding to the authentication information against the vehicle other than driving of the vehicle.

7. The vehicle monitoring device according to claim 6, wherein
the processor is configured to store image data captured by the camera and the point cloud data of the person in time order
when the processor determines that the person does not have the valid authentication information, or
when the processor determines that the person has the valid authentication information but the valid authentication information does not correspond to driving of the vehicle, and the processor determines that the person does not perform the action corresponding to the authentication information against the vehicle other than driving of the vehicle.

8. The vehicle monitoring device according to claim 1, wherein
the processor is configured to store the point cloud data of the person in time order when the processor determines that the authentication information of the person is valid.

9. A vehicle monitoring method for monitoring a person around a vehicle, the method comprising:
detecting the person around the vehicle based on point cloud data acquired from a sensor that emits search waves;
determining that the detected person has authentication information valid for an action against the vehicle;
determining what action the person is performing based on at least the point cloud data:
determining an action allowed to be performed by the person against the vehicle based on the authentication information; and
determining that the action performed by the person corresponds to the action allowed to be performed by the person.

10. A non-transitory computer readable storage medium having instructions that, when executed by a computer, cause the computer to perform a method of monitoring a person around a vehicle, the method comprising:
detecting the person around the vehicle based on point cloud data acquired from a sensor that emits search waves;
determining whether the detected person has authentication information valid for an action against the vehicle
determining what action the person is preforming based on at least the point cloud data;
determining an action allowed to be performed by the person against the vehicle based on the authentication information when the authentication information is determined to be valid; and
determining whether the action performed by the person corresponds to the action allowed to be performed by the person when the authentication information is determined to be valid.

* * * * *